United States Patent
Basters et al.

(10) Patent No.: US 9,308,849 B2
(45) Date of Patent: Apr. 12, 2016

(54) DEVICE FOR GUIDING A SEAT BELT ON A SEAT HAVING AN INTEGRATED SEAT BELT

(71) Applicant: Johnson Controls Components GmbH & Co.KG, Kaiserslautern (DE)

(72) Inventors: Udo Basters, Stahlberg (DE); Peter Paulus, Becherbach (DE); Harald Zumbach, Enkenbach-Alsenborn (DE)

(73) Assignee: Johnson Controls Components GmbH & Co.KG, Kaiserslautern (DE)

( * ) Notice: Subject to any disclaimer, the term of this patent is extended or adjusted under 35 U.S.C. 154(b) by 0 days.

(21) Appl. No.: 14/370,632

(22) PCT Filed: Dec. 17, 2012

(86) PCT No.: PCT/EP2012/075787
§ 371 (c)(1),
(2) Date: Jul. 3, 2014

(87) PCT Pub. No.: WO2013/102552
PCT Pub. Date: Jul. 11, 2013

(65) Prior Publication Data
US 2014/0368015 A1    Dec. 18, 2014

(30) Foreign Application Priority Data

Jan. 4, 2012 (DE) .......................... 10 2012 100 060
Apr. 10, 2012 (DE) .......................... 10 2012 103 038

(51) Int. Cl.
*B60R 22/00* (2006.01)
*B60N 2/68* (2006.01)
(Continued)

(52) U.S. Cl.
CPC .............. *B60N 2/688* (2013.01); *B60N 2/2222* (2013.01); *B60R 22/18* (2013.01); *B60R 22/26* (2013.01); *B60R 2022/1818* (2013.01)

(58) Field of Classification Search
CPC .... B60N 2/2222; B60N 2/688; B60N 2/0715; B60N 2/0732; B60N 2/0825; B60R 2022/1818; B60R 22/26; B60R 22/105; B60R 22/18
USPC ................. 297/473, 468, 483, 284.1, 354.11, 297/463.1
See application file for complete search history.

(56) References Cited

U.S. PATENT DOCUMENTS 4,810,036 A * 3/1989 Buser ............................ 297/464
5,439,272 A * 8/1995 Hallet et al. ................... 297/479
(Continued)

FOREIGN PATENT DOCUMENTS

DE        66 08 216 U     7/1971
DE     10 2004 043433 A1  3/2006
(Continued)

*Primary Examiner* — Milton Nelson, Jr.
(74) *Attorney, Agent, or Firm* — McGlew and Tuttle, P.C.

(57) ABSTRACT

A device for guiding a seat belt on a seat having an integrated seat belt. In order to provide a device that can be economically and easily installed, that ensures reliable guidance of the seat belt inside the backrest (1) of a seat having an integrated seat belt in a simple manner, and that prevents pinching of the seat belt (2) during adjustment inside the backrest (1), the seat belt guide has at least one upper seat belt guiding element (6). The guiding element (6) is above a pivot axis (5) of a multi-piece backrest (3, 4) of the seat having an integrated seat belt. At least one lower seat belt guiding element (7) is also provided below the pivot axis (5) of the multipiece backrest (3, 4) of the seat having an integrated seat belt.

8 Claims, 4 Drawing Sheets

(51) Int. Cl.
  *B60N 2/22*   (2006.01)
  *B60R 22/26*  (2006.01)
  *B60R 22/18*  (2006.01)

(56) References Cited

U.S. PATENT DOCUMENTS

| | | | |
|---|---|---|---|
| 6,135,561 A | | 10/2000 | Krüger et al. |
| 6,139,059 A | * | 10/2000 | Metzger ................. 280/808 |
| 2008/0030013 A1 | * | 2/2008 | Burghardt ............... 280/808 |

FOREIGN PATENT DOCUMENTS

| | | | |
|---|---|---|---|
| DE | 10 2007 046271 A1 | | 4/2009 |
| DE | 102010014167 A1 | * | 12/2011 |
| EP | 1669239 A2 | * | 6/2006 |
| EP | 2 003 014 A2 | | 12/2008 |
| JP | 2000-513291 A | | 10/2000 |
| JP | 2001-315559 A | | 11/2001 |
| JP | 2005-145167 A | | 6/2005 |
| JP | 2011-051448 A | | 3/2011 |
| WO | 97/18109 A1 | | 5/1997 |

* cited by examiner

DEVICE FOR GUIDING A SEAT BELT ON A SEAT HAVING AN INTEGRATED SEAT BELT

CROSS REFERENCE TO RELATED APPLICATIONS

This application is a United States National Phase Application of International Application PCT/EP2012/075787 filed Dec. 17, 2012 and claims the benefit of priority under 35 U.S.C. §119 of German Patent Application DE 10 2012 100 060.3 filed Jan. 4, 2012 and German Patent Application DE 10 2012 103 038.3 filed Apr. 10, 2012, the entire contents of which are incorporated herein by reference.

FIELD OF THE INVENTION

The invention relates to a device for guiding a seat belt on a seat having an integrated seat belt, with at least one upper seat belt guiding element above a pivot axis of a multi-piece backrest of the seat having an integrated seat belt and at least one lower seat belt guiding element below the pivot axis of the multi-piece backrest of the seat having an integrated seat belt as well as a seat having an integrated seat belt for a motor vehicle.

BACKGROUND OF THE INVENTION

Seats having an integrated seat belt, which are used in particular for convertibles or commercial vehicles, are known in many designs from the state of the art. In the case of such seat belts, the belt progresses partially inside the seat, wherein an automatic retractor of the seat belt is generally fastened on the bottom part of a seat frame. The seat belt then progresses upwards within a backrest and exits from it towards the front in the upper part of the backrest.

To increase comfort, some known seats having an integrated seat belt have devices for changing the curvature of the backrest surface, wherein for this the backrests can be designed in multiple pieces, which enables an adjustment of the angle of the different backrest sections relative to each other.

To ensure the free mobility of the belt in all possible orientations of the backrest, a device for guiding the seat belt inside the adjustable backrest is needed. Otherwise, there is a risk that the seat belt will become pinched inside the backrest between a seat-internal support structure of the backrest and an outer padding of the front side of the backrest or an outside cover of the back side of the backrest. To secure the function, it is already known to use an inherently stable, flexible plastic channel to guide the belt inside the backrest. However, this is very expensive and installation is complex.

SUMMARY OF THE INVENTION

The object of the invention is to provide an economic device that can be easily installed, that ensures reliable guidance of the seat belt inside the backrest of a seat having an integrated seat belt in a simple manner, and that prevents pinching of the seat belt during adjustment inside the backrest.

The device according to the invention for guiding a seat belt on a seat having an integrated seat belt comprises at least two seat belt guiding elements, wherein at least one of the seat belt guiding elements is located above a pivot axis of a multi-piece backrest and at least one additional seat belt guiding element is arranged below the pivot axis of the named, multi-piece backrest. Here and in the following, specifications like "above" and "below" thereby refer to the installation position of the seat having an integrated seat belt in the vehicle. The arrangement of the seat belt guiding elements, on the seat having an integrated seat belt, is selected such that a pinching of the belt during an adjustment of the backrest, in the area of the pivot axis, is prevented. In particular, the seat is with a front-side padded surface of the backrest, a cover on the backside of the backrest, which can be made of an inherently stable, flexible material, such as plywood, cardboard or a plastic plate, or an internal component of the backrest, such as a part of the frame structure, a seat strut or lumbar support. Secure belt guidance in any arrangement of the upper and of the lower backrest part relative to each other is enabled.

In general, any material can be used to produce the seat belt guiding elements. It is thus for example possible to make the seat belt guiding element out of a plastic or a composite material. However, according to an advantageous embodiment of the seat belt guide according to the invention, at least one seat belt guiding element is made of metal, preferably metal wire, whereby a cost-effective production and simple installation is possible. The use of a metal wire allows moreover a simple shaping so that the seat belt guiding element can be produced in a particularly cost-effective manner in the provided shape.

In a particularly advantageous embodiment of the invention, at least one seat belt guiding element is formed by the shaping of a component of a seat-internal support structure of the seat having an integrated seat belt. The seat belt guiding element is thereby preferably formed by the bending of an elongation of a seat-internal lumbar support made out of metal wire. In this manner, cost-effective belt guidance is advantageously obtained, in which installation of a separate component is not necessary since it is only formed in a simple manner through the bending of existing components, or respectively elongations of these components.

Moreover, a seat belt guiding element can also be designed as part of a seat strut, a seat spring or any other component of the backrest through bending, deformation, elongation, extension or shaping of hollow spaces. The seat belt guiding element can thereby be formed from an individual component of the seat-internal support structure or formed from several different such components.

In an advantageous further embodiment of the invention, at least one seat belt guiding element has at least two seat belt guiding sections for the two-sided guidance of the seat belt, whereby a pinching of the seat belt inside the seat having an integrated seat belt is prevented in all possible orientations of the multi-piece backrest having a pivot axis in a simple manner.

The seat belt guiding sections of a seat belt guiding element preferably progress at an angle with respect to the direction of progression of the seat belt, particularly preferably at a right angle, whereby risk of a lateral sliding of the seat belt off the seat belt guiding element is reduced in a particularly reliable manner.

In a particularly preferred embodiment of the invention, several seat belt guiding sections of a seat belt guiding element are arranged at a distance from each other in the direction of progression of the seat belt. An embodiment with two opposite-lying, seat belt guiding sections of a seat belt guiding element on both sides of the belt is also possible.

Furthermore, it is provided according to an advantageous embodiment of the invention that at least one seat belt guiding element with seat belt guiding sections arrangeable on both sides of the seat belt has a side edge connecting the sections and securing the seat belt from sliding off laterally, whereby a particularly precise belt guidance is reached and a sliding of the seat belt out of the seat belt guiding element during use is prevented in a simple manner.

In a particularly preferred manner, at least one seat belt guiding element has three seat belt guiding sections arranged along the seat belt progression direction at a distance from each other, wherein the outer sections are arrangeable on one side of the seat belt and the section lying between the outer sections is arrangeable on the other side of the seat belt. The outer sections are to be understood as those two sections of a seat belt guiding element that are located at the greatest distance from each other in the arrangement of the seat belt guiding sections displaced at a distance from each other in the seat belt progression direction. In a particularly advantageous further development of this design, the seat belt guiding element is formed from an individual component of the seat having an integrated seat belt and is produced through shaping such that it additionally surrounds the seat belt on both lateral edges, whereby a sliding of the belt out of the device for guiding the seat belt is excluded in a particularly advantageous manner.

In an advantageous embodiment of the seat having an integrated seat belt according to the invention, the seat belt guiding elements are connected directly with a frame element of the backrest. Furthermore, embodiments of the seat having an integrated seat belt are also possible in which a seat belt guiding element is first connected with another part of the seat structure or exclusively with a padding and covering material of the backrest.

Furthermore, the invention relates to a seat having an integrated seat belt for a motor vehicle, with a multipart backrest pivotable around a pivot axis, a seat belt progressing at least partially within the backrest of the seat having an integrated seat belt and the device for guiding a seat belt according to the invention described above.

It is advantageous with respect to the devices of the state of the art that the installation effort of the seat belt guidance according to the invention is greatly reduced with respect to the previously known devices and the production and installation costs of the seat having an integrated seat belt are thereby reduced considerably.

In a possible further embodiment, of the seat having an integrated seat belt, a seat belt guiding element is arranged, such that a seat belt guiding section of the seat having an integrated seat belt, is required only on one side of the seat belt. This is in order to ensure unhindered seat belt guidance. For instance, this is when another component of the seat having an integrated seat belt not specially shaped for seat belt guidance is located on the other side of the seat belt or when there is enough distance to other components inside the seat on one side of the seat belt.

One exemplary embodiment of the invention will be explained in greater detail below with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
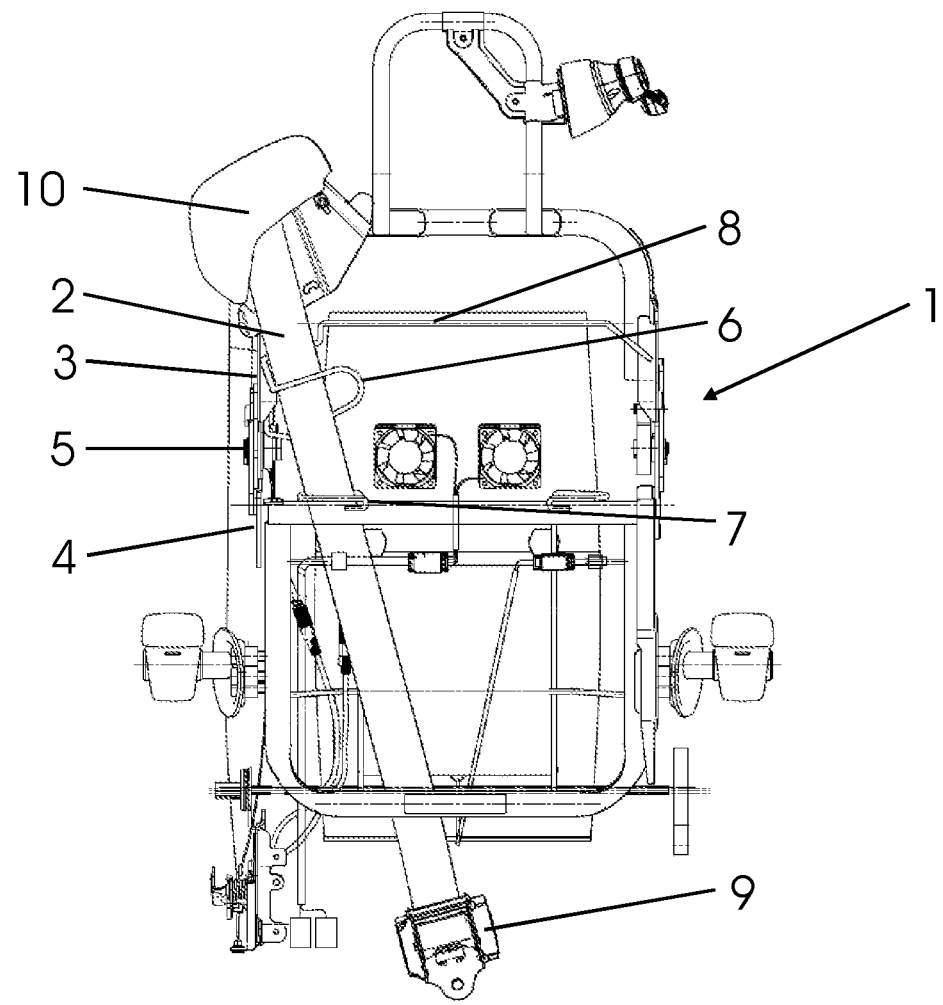
FIG. 1 is a rear view of a backrest having an integrated seat belt with an upper and a lower seat belt guiding element on each side of a two-part backrest having an integrated seat belt.

Referring to the drawings in particular, a backrest having an integrated seat belt 1 shown in a rear view in FIG. 1 comprises two backrest parts 3, 4 arranged above each other vertically—relating to the installation position of a seat having an integrated seat belt (not shown here) in a vehicle—, wherein the upper backrest part 3 can be pivoted around a pivot axis 5 relative to the lower backrest part 4.

An automatic retractor 9 of a seat belt 2 is arranged in the lower area of the backrest having an integrated seat belt 1, the seat belt progressing upwards inside the backrest having an integrated seat belt 1 until it exits from a seat belt outlet opening 10 on the top end of the backrest having an integrated seat belt 1 towards the front side.

An upper seat belt guiding element 6 is arranged above the pivot axis 5 in the area of the upper backrest part 3, wherein the upper seat belt guiding element has several seat belt guiding sections that progress at an angle to the seat belt 2.

In the case of the exemplary embodiment of the device for seat belt guidance shown in FIG. 1, the upper seat belt guiding element 6 is formed through a bending of a piece of a metallic lumbar support 8 that is attached to the upper backrest part 3. The device for seat belt guidance is comprised of a total of three seat belt guiding sections progressing almost at a right angle to the seat belt 2. Each of the three seat belt guiding sections is arranged at a distance from each other, above each other vertically—relating to the installation position of the seat having an integrated seat belt—and relative to each other along the progression of the seat belt 2. The uppermost and the bottommost of the three sections is located on the side of the seat belt 2 facing the front side of the backrest having an integrated seat belt 1 and the third part of the upper seat belt guiding element 6 lying between these two named seat belt guiding sections is located on the side of the seat belt 2 facing the back side of the backrest having an integrated seat belt 1 (see FIGS. 2-4).

Figure 2:
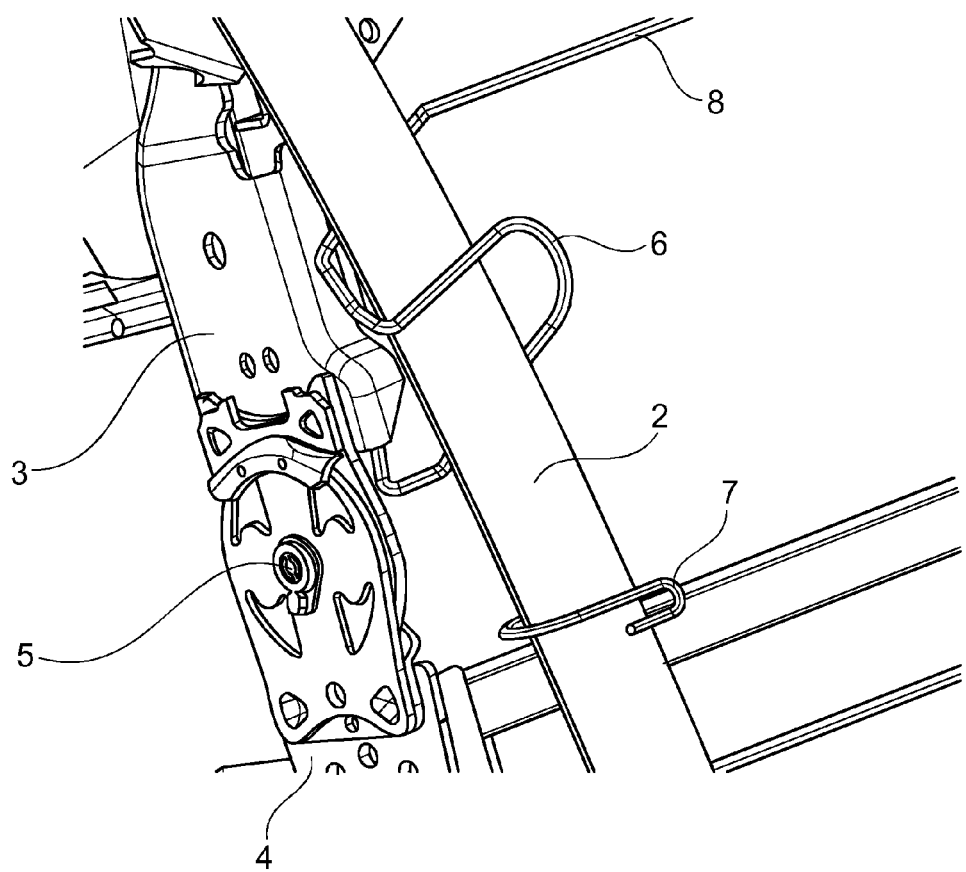
FIG. 2 is a first perspective view of a partial area of the backrest having an integrated seat belt from FIG. 1.
Figure 3:
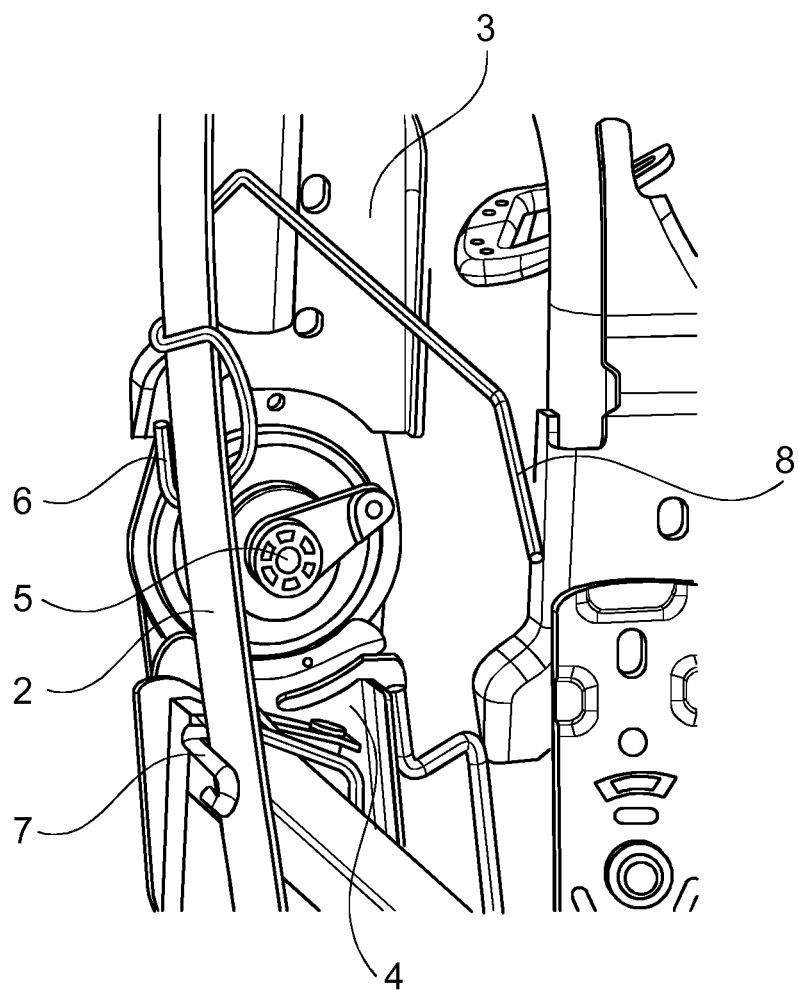
FIG. 3 is a second perspective view of a partial area of the backrest having an integrated seat belt from FIG. 1.
Figure 4:
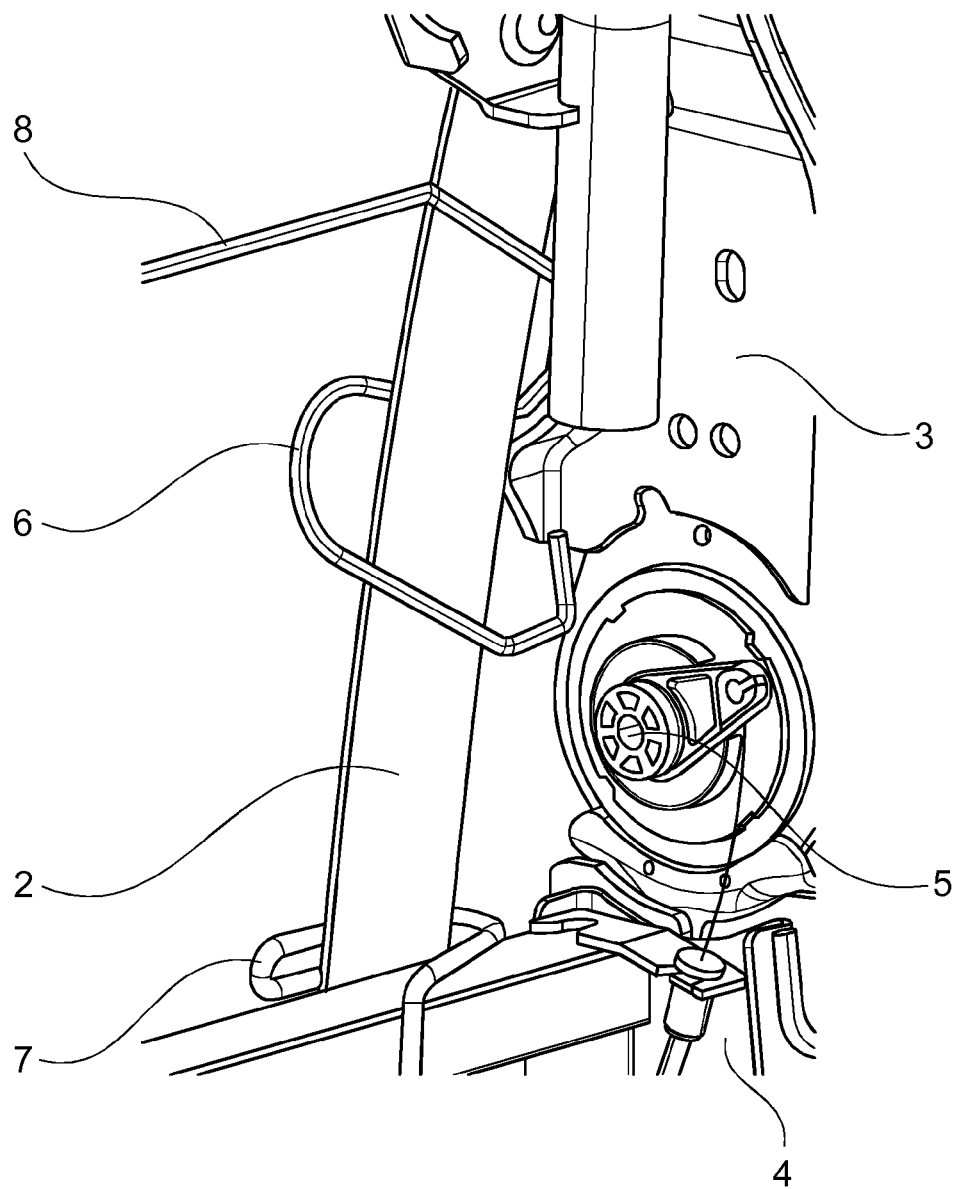
FIG. 4 is a third perspective view of a partial area of the backrest having an integrated seat belt from FIG. 1.

Since the upper seat belt guiding element 6 is formed through multiple bendings of an individual workpiece, two areas, in which the seat belt guiding element 6 progresses parallel to the seat belt and alternating from one side to the other side of the seat belt and secures it from a lateral slipping inside the backrest having an integrated seat belt 1 or from sliding out of the seat belt guiding element 6, are located between the three seat belt guiding sections of the upper seat belt guiding element 6 progressing on both sides of the seat belt 2, as can be seen particularly clearly in the perspective views of this embodiment of the present seat belt guiding element 6 from different viewing directions in FIGS. 2-4, which show a partial area of the seat having an integrated seat belt from FIG. 1.

A lower seat belt guiding element 7, which comprises two sections located on different sides of the belt 2, is located below the pivot axis 5 in the area of the lower backrest part 4, wherein both sections are arranged in the seat belt progression direction opposite each other—relating to the installation position of the seat having an integrated seat belt in the vehicle—at the same height.

The lower seat belt guiding element 7 is also formed as part of a seat-internal support structure 8 through multiple bendings of this metallic component, wherein the seat belt guiding element 7 is guided around the seat belt 2 on the side of the seat belt 2 facing the outer edge of the backrest having an integrated seat belt 1 and thus secures it from a lateral slipping in the direction of the frame of the lower backrest part 4, as also shown in a detailed manner in FIGS. 2-4 from different viewing directions.

The side of the seat belt 2 facing the front side of the backrest having an integrated seat belt 1 is not guided by the seat belt guiding element 7 but rather by a seat-internal support structure 8 with which the seat belt guiding element 7 is connected.

But embodiments of the lower seat belt guiding element 7 with more than one seat belt guiding section are also possible. Several seat belt guiding sections of the seat belt guiding element 7 offset with respect to each other or lying directly opposite each other are thereby conceivable along the seat belt progression.

While specific embodiments of the invention have been shown and described in detail to illustrate the application of the principles of the invention, it will be understood that the invention may be embodied otherwise without departing from such principles.

The invention claimed is:

1. A device for guiding a seat belt of a seat, wherein the seat has an integrated seat belt, the device comprising:
   an upper seat belt guiding element; and
   a lower seat belt guiding element, wherein the seat belt guiding elements are designed and arranged with respect to each other such that a pinching of the seat belt is prevented during an adjustment of a multi-piece backrest and unhindered mobility is ensured along a seat belt progression direction, wherein at least one of the upper seat belt guiding element and the lower seat belt guiding element has three sections arranged offset at a distance from each other along the seat belt progression direction, wherein outer sections of said three sections are arrangeable on one side of the seat belt and one of said three sections lying between the outer sections is arrangeable on the other side of the seat belt, wherein at least one of the upper seat belt guiding element and the lower seat belt guiding element comprises an extension of a component of a seat-internal lumbar support.

2. The device for guiding a seat belt according to claim 1, wherein at least one of the upper seat belt guiding element and the lower seat belt guiding element has a side edge connecting the three sections and securing the seat belt from lateral slipping.

3. The device for guiding a seat belt according to claim 1, wherein the three sections of at least one of the upper seat belt guiding element and the lower seat belt guiding element progresses at an angle to the seat belt progression direction.

4. The device for guiding a seat belt according to claim 1, wherein at least one of the upper seat belt guiding element and the lower seat belt guiding element is made of metal wire.

5. A seat having an integrated seat belt for a motor vehicle, the seat comprising:
   a multi-piece backrest having an integrated seat belt pivotable around a pivot axis;
   a seat belt progressing at least partially within the backrest having an integrated seat belt; and
   a device for guiding a seat belt, the device comprising:
   an upper seat belt guiding element above the pivot axis of the multi-piece backrest of the seat; and
   a lower seat belt guiding element below the pivot axis of the multi-piece backrest of the seat, wherein the seat belt guiding elements are designed and arranged with respect to each other such that a pinching of the seat belt is prevented during an adjustment of the multi-piece backrest and unhindered mobility is ensured along a seat belt progression direction, at least one of the upper seat belt guiding element and the lower seat belt guiding element having three sections arranged offset at a distance from each other along the seat belt progression direction, wherein outer sections of said three sections are arrangeable on one side of the seat belt and one of the three sections lying between the outer sections is arrangeable on the other side of the seat belt, wherein at least one of the upper seat belt guiding element and the lower seat belt guiding element is an extension of a component of a seat-internal lumbar support.

6. The seat for guiding a seat belt according to claim 5, wherein at least one of the upper seat belt guiding element and the lower seat belt guiding element is made of metal wire.

7. The seat for guiding a seat belt according to claim 5, wherein the three sections of at least one of the upper seat belt guiding element and the lower seat belt guiding element progress at an angle to the seat belt progression direction.

8. The seat for guiding a seat belt according to claim 5, wherein at least one of the upper seat belt guiding element and the lower seat belt guiding element has a side edge connecting the three sections and securing the seat belt from lateral slipping.

* * * * *